(12) United States Patent
Matama

(10) Patent No.: US 6,473,198 B1
(45) Date of Patent: Oct. 29, 2002

(54) IMAGE PROCESSING APPARATUS

(75) Inventor: Toru Matama, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/156,399

(22) Filed: Sep. 18, 1998

(30) Foreign Application Priority Data

Sep. 19, 1997 (JP) .............................................. 9-255031

(51) Int. Cl.[7] ........................... H04N 1/46; G06K 15/00
(52) U.S. Cl. ........................ 358/1.9; 358/453; 358/538
(58) Field of Search ................................ 358/487, 506, 358/448, 453, 1.9, 538

(56) References Cited

U.S. PATENT DOCUMENTS

| 5,703,701 A | * | 12/1997 | Yamamoto | 358/487 |
| 5,739,924 A | * | 4/1998 | Sano | 358/487 |
| 5,872,643 A | * | 2/1999 | Maeda et al. | 358/518 |
| 6,118,556 A | * | 9/2000 | Yamamoto | 358/487 |

* cited by examiner

Primary Examiner—Jerome Grant, II
(74) Attorney, Agent, or Firm—Birch, Stewart, Kolasch & Birch, LLP

(57) ABSTRACT

The improved image processing apparatus comprises a device for receiving input image data from a source of image data supply; an image processing device for performing necessary image processing on the received input image data to produce output image data; an extracting device for extracting at least one specified portion of an image carried by the input image data; and a setting device for setting image processing conditions in accordance with the at least one specified portion extracted by the extracting device and the input image data, and the image processing device performs the image processing on the input image data in accordance with the image processing conditions set by the setting device. This image processing apparatus allows for the setting of image processing conditions that are optimal for the scene of a picture of interest. In digital photoprinters, high-quality prints reproducing images of high quality can be produced consistently.

34 Claims, 9 Drawing Sheets

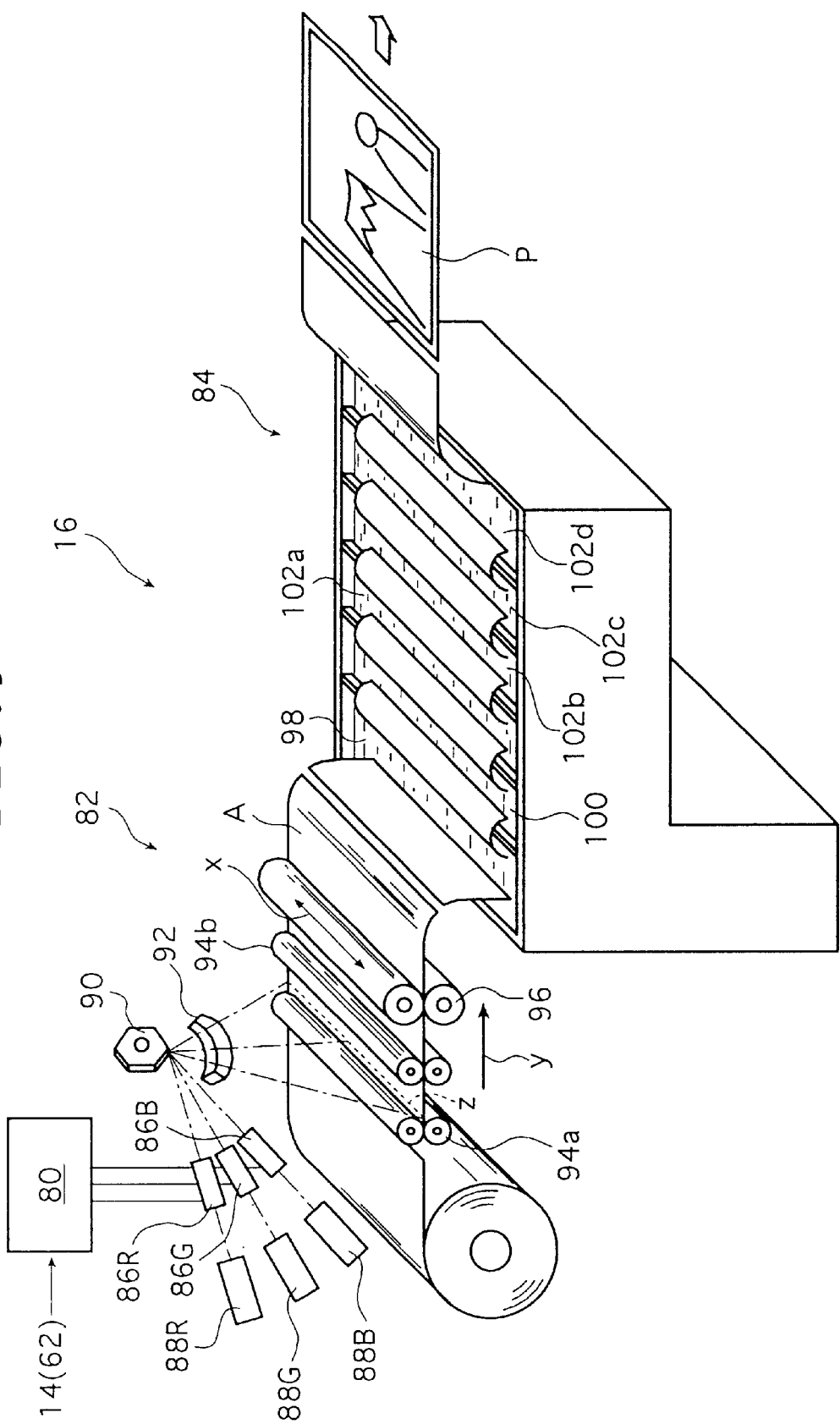

IMAGE PROCESSING APPARATUS

BACKGROUND OF THE INVENTION

The present invention relates to the technical field of a digital image processing apparatus for use with digital photoprinters and like machines that read the image on a film photoelectrically and output a print (photograph) having the image reproduced thereon.

Most of the images recorded on photographic films such as negatives and reversals (which are hereinafter referred to as "films") are conventionally printed onto light-sensitive materials (photographic papers) by a technique generally called "direct exposure" (analog exposure) in which the image on a film is projected onto the light-sensitive material for areal exposure.

A printer that adopts digital exposure has recently been commercialized. In this "digital photoprinter", the image recorded on a film is read photoelectrically and converted into digital signals, which are subjected to various kinds of image processing to produce recording image data; a light-sensitive material is exposed by scanning with recording light modulated in accordance with the image data, thereby recording a (latent) image which is then processed photographically to produce a print.

In digital photoprinters, the image is converted to digital image data and exposing conditions can be determined by processing that image data. Hence, by using such digital photoprinters, the correction of dropouts or blocked-ups due to photography with rear light or an electronic flash, sharpening, the correction of color or density failures, the correction of under- or over-exposure, the correction of the insufficiency of marginal light and various other kinds of image processing can be performed effectively enough to produce prints of high quality that have heretofore been impossible to obtain by the direct exposure technique. In addition, a plurality of images can be composited into a single image or one image can be split into segments or even characters can be composited by the processing of image data. If desired, prints can be outputted after desired editing/processing in accordance with a specific application.

The capability of digital photoprinters is by no means limited to outputting the image as a print (photograph) and they enable the image data to be supplied to computers or stored in recording media such as floppy disks; thus, with digital photoprinters, the image data can be used in various applications other than photography.

Having these features, the digital photoprinter is composed of the following three basic parts: a scanner (image reading apparatus) that reads the image on a film photoelectrically; an image processing apparatus that performs image processing of the read image to determine the exposing conditions for image recording; and a printer (image recording apparatus) that scan exposes a light-sensitive material in accordance with the determined exposing conditions and performs development and other necessary processes to produce a print.

In the scanner, the reading light issuing from a illuminant is allowed to be incident on the film, thereby producing projected light that carries the image recorded on the film; the projected light is then passed through an imaging lens to be focused on an image sensor such as a CCD sensor which performs photoelectric conversion to read the image, which is optionally subjected to various kinds of image processing before it is sent to the image processing apparatus as the image data (image data signals) from the film.

In the image processing apparatus, the image processing conditions are set on the basis of the image data that has been read with the scanner and image processing is applied to the image data in accordance with the thus set conditions, thereby producing output image data for image recording (i.e., exposing conditions) that are subsequently sent to the printer.

In the printer, if it is an apparatus that adopts exposure by scanning with optical beams, the beams are modulated in accordance with the image data supplied from the image processing apparatus and as said optical beams are deflected in a main scanning direction, the light-sensitive material is transported in an auxiliary scanning direction perpendicular to the main scanning direction, whereby the light-sensitive material is exposed to the image-carrying optical beams to form a latent image; the exposed light-sensitive material is then developed and otherwise processed in accordance with its type so as to produce a finished print (photograph) reproducing the image that has been recorded on the film.

As mentioned above, the image processing apparatus in a digital photoprinter sets the image processing conditions in accordance with the image data that has been read with the scanner and the image data is processed under the thus set image processing conditions to produce the output image data.

In practice, however, the conventional image processing apparatus sets the image processing conditions in an invariable way without regard to the scene of a picture of interest, i.e., irrespective of whether it is a portrait, a landscape or whatever it is. This means that the image processing applied is not necessarily optimal and occasionally fails to output prints of the best quality.

SUMMARY OF THE INVENTION

An object, therefore, of the present invention is to provide an image processing apparatus that is suitably used with digital photoprinters and that sets image processing conditions optimal for a particular scene of a picture, thereby allowing for consistent production of high-quality prints that reproduce images of high quality.

The stated object of the invention can be attained by an image processing apparatus comprising:

means for receiving input image data from a source of image data supply;

image processing means for performing necessary image processing on the input image data received by said receiving means to produce output image data;

extracting means for extracting at least one specified portion of an image carried by the input image data; and setting means for setting image processing conditions in accordance with said at least one specified portion extracted by said extracting means and the input image data;

wherein said image processing means performs the image processing on the input image data in accordance with the image processing conditions set by said setting means.

Preferably, said setting means changes in accordance with said at least one specified portion extracted by said extracting means the image processing conditions set in accordance with the input image data.

Preferably, said image processing conditions changed by setting means are processing contents of said image processing performed on said input image data by said image processing means.

Preferably, said processing contents of said image processing are at least one process selected from the group consisting of sharpness enhancement, dodging, gradation conversion, gray balance correction for removal of stain, color correction, blurring and correction of an exposing illuminant.

Preferably, said setting means selects the image processing conditions in accordance with at least one specified portion extracted by said extracting means among a plurality of sets of the image processing conditions previously set.

Preferably, said setting means changes the image processing conditions of the overall image carried by the input image data which contains said at least one specified portion extracted by extracting means to set same image processing conditions for said at least one specified portion and other regions.

Preferably, said setting means changes the image processing conditions set in accordance with said input image data only for said at least one specified portion extracted by extracting means.

Preferably, said setting means sets the image processing conditions which are different between said at least one specified portion and other regions.

Preferably, setting of the image processing conditions in accordance with said input image data by said setting means and extraction of the at least one specified portion by said extracting means are performed in parallel steps.

Preferably, the image processing apparatus further includes display means for presenting at least one of a result of extraction of said at least one specified portion and an image that has been subjected to the image processing in accordance with the image processing conditions set by said setting means except or including the at least one specified portion.

Preferably, at least one of the steps of extracting the at least one specified portion by said extracting means, setting the image processing conditions by said setting means and presenting the image by said display means is performed using image data having a lower pixel density than the output image data.

Preferably, at least one of the steps of extracting the at least one specified portion by said extracting means, setting the image processing conditions by said setting means and presenting the image by said display means that is performed using the image data having the lower pixel density than the output image data, and the step of obtaining image data having a higher pixel density than said image data having the lower pixel density as said input image data on which said image processing is performed by said image processing means to produce said output image data are performed in parallel steps.

Preferably, at least one modification of addition, correction and deletion of said at least one specified portion presented by said display means is capable of being performed.

Preferably, said image performed in accordance with the image processing conditions set by said setting means and presented by said display means is capable of being modified except or including said at least one specified portion.

Preferably, the image processing apparatus further comprises means for subjecting said input image data to color/tone correction, wherein said extracting means extracts the at least one specified portion using image data that has been subjected to the color/tone correction.

Preferably, the image processing apparatus further comprises means for subjecting said input image data to gray balance adjustment, wherein said extracting means extracts said at least one specified portion using image data that has been subjected to gray balance adjustment.

Preferably, said setting means has an autosetup function for automatically setting up said input image data, and said extracting means extracts said at leas one specified portion based on image data set up automatically by said setting means or an image carried by the image data.

Preferably, said setting means has two selectable modes as setting modes of the image processing conditions, one being an automatic mode in which the setting means performs automatic setting and the other being a command mode which fully or partly relies upon operator's commands.

Preferably, said setting means has two swichable modes, one setting the image processing conditions in accordance with said at least one specified portion extracted by said extracting means and said input image data, and the other setting the image processing conditions in accordance with only said input image data independent of said at least one specified portion extracted by said extracting means.

Preferably, said apparatus has at least one of two selecting functions, one selecting function selecting either one of a mode in which said setting means sets different image processing conditions for said at least one specified portion and other regions or a mode in which said setting means sets same image processing conditions for said at least one specified portion and other regions, and other selecting function selecting either one of a mode in which said image processing conditions for said at least one specified portion are changed or a mode in which said image processing conditions for the overall image carried by said input image data including said at least one specified portion; and wherein said apparatus has two swichable mode one being an automatic mode in which said at least one of the two selecting functions perform automatic selecting and the other being a command mode which relies upon operator's commands.

BRIEF DESCRIPTION OF THE DRAWINGS

FIG. 9 shows diagrammatically the printer section of the digital photoprinter shown in FIG. 1.

DETAILED DESCRIPTION OF THE INVENTION

The image processing apparatus of the invention will now be described in detail with reference to the preferred embodiments shown in the accompanying drawings.

Figure 1:
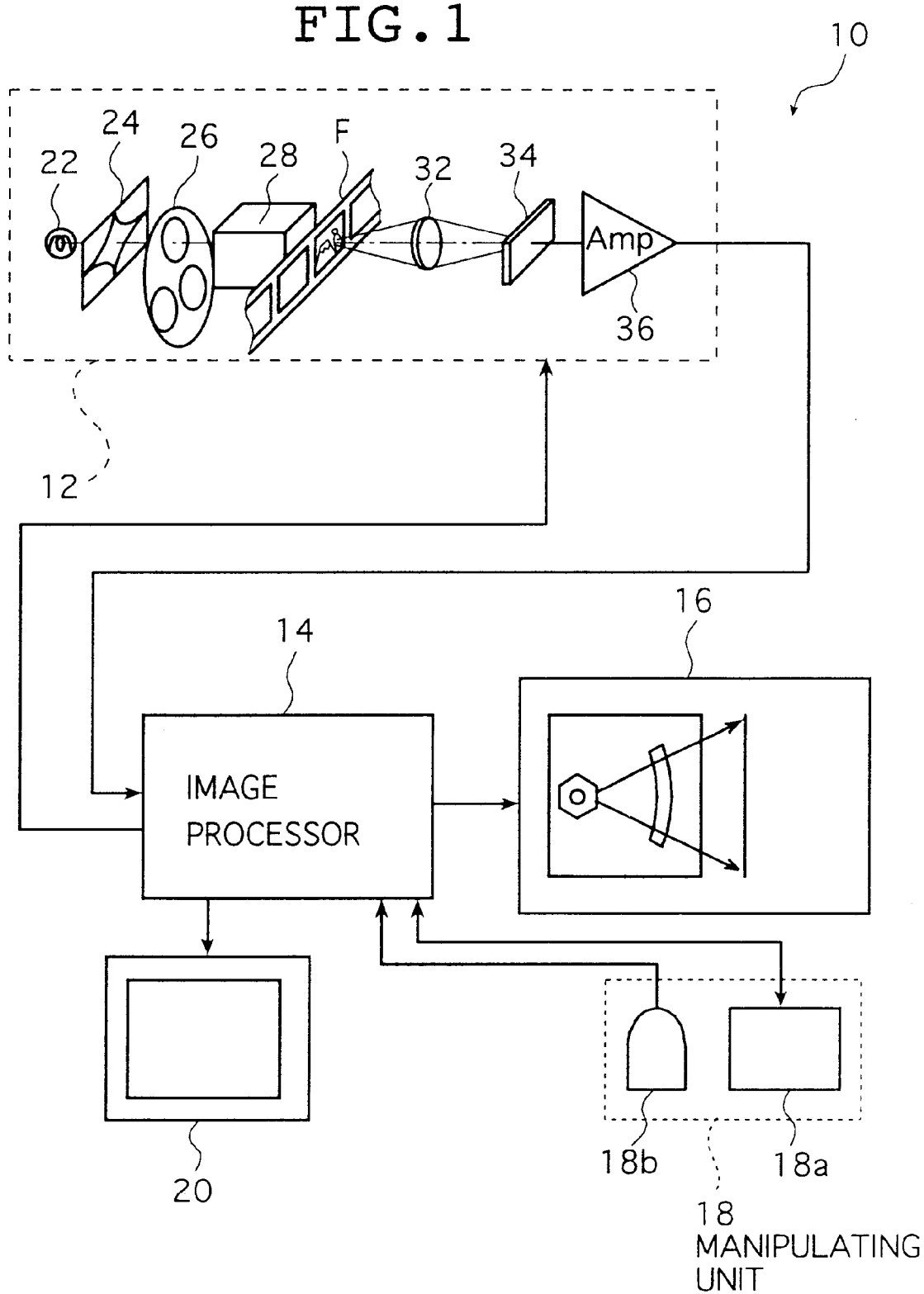
FIG. 1 is a block diagram for an exemplary digital photoprinter using the image processing apparatus of the invention.

FIG. 1 is a block diagram for an exemplary digital photoprinter using the image processing apparatus of the invention. The digital photoprinter generally indicated by 10 in FIG. 1 and which is hereinafter referred to simply as the "photoprinter" basically comprises: a scanner (image reading apparatus) 12 that reads the image on a film F photoelectrically; an image processing apparatus 14 that performs image processing of the thus read image data (image information), that selects, sets and changes the image processing conditions, and that allows for manipulation, control and otherwise of the photoprinter 10 in its entirety; and a printer (image recording apparatus) 16 that exposes a light-sensitive material A imagewise with optical beams modulated in accordance with the image data processed in the image processing apparatus 14, develops and otherwise processes the material A and outputs it as a (finished) print P.

Connected to the image processing apparatus 14 are a manipulation unit 18 having a keyboard 18a and a mouse 18b to enter (set) various conditions, to select and issue a command for a specific processing step and to enter commands for color/density correction, as well as a display 20 that displays the image read with the scanner 12, various kinds of manipulative instructions, and screens on which various conditions are set and/or registered.

The scanner 12 is an apparatus for reading the image on the film F photoelectrically frame by frame. It comprises an illuminant 22, a variable diaphragm 24, a color filter plate or assembly 26 that has three color filters for separating the image 26 into three primaries R (red), G (green) and B (blue) and which rotates to insert any one of the color filters into the optical path, a diffuser box 28 with which the reading light incident on the film F is made uniform on the plane of the film F, an imaging lens unit 32, a CCD sensor 34 which is an area sensor that reads the image in each frame of the film, and an amplifier 36.

The illustrated photoprinter 10 has dedicated carriers available that can be selectively mounted in the housing of the scanner 12 depending upon such factors as the type and size of films such as an Advanced Photo System and negatives (or reversals) of 135 size, the physical form of the film (e.g. whether it is a strip or a slide) and the kind of treatment to be applied (e.g. trimming). By changing carriers, the photoprinter 10 is capable of handling various kinds of films and treatments.

In the scanner 12, reading light issuing from the illuminant 22 is adjusted in quantity by passage through the variable diaphragm 24, then passed through the color filter plate 26 for color adjustment, and diffused in the diffuser box 28; the thus treated reading light is incident on the film F, through which it is transmitted to produce projected light that carries the image in a particular frame of the film F.

The projected light from the film F passes through the imaging lens unit 32 to be focused on the light-receiving plane of the CCD sensor 34 and read with the CCD sensor 34 photoelectrically; the resulting output signal is amplified with the amplifier 26 and thereafter sent to the image processing apparatus 14.

The CCD sensor 34 may be an area CCD sensor having for example 1380×920 pixels. In the illustrated system, the CCD sensor 34 is adapted to move around two-dimensionally (both horizontally and vertically along the pixels) by an amount equivalent to half a pixel; because of this feature, the number of pixels that can be read with the CCD sensor 34 is apparently increased by a factor of up to 4.

In the scanner 12, the above-described process of image reading is performed three times by sequentially inserting the respective color filters in the color filter plate 26 into the optical path of the reading light, whereupon the image in one frame is separated into three primaries R, G and B.

Prior to fine scanning, or the image reading for outputting a print P, the photoprinter 10 performs prescanning, or reading of the image at a lower resolution, in order to determine the image processing conditions and so forth. This means the image reading is performed a total of six times for one frame.

In the illustrated photoprinter 10, the scanner 12 that reads the image on a film such as a negative or reversal photoelectrically is used as a source of supplying image data to the image processing apparatus 14. Other sources may of course be used to supply image data into the image processing apparatus of the invention which encompasses the illustrated image processing apparatus 14 and they are exemplified by various kinds of image reading means, imaging means and image data storage means including an image reading apparatus that reads the image on a reflection original, a digital camera, a digital video camera, communication means such as a LAN (local area network) and a computer conferencing network and various other media such as a memory card and MO (magnetooptical recording medium).

As already mentioned, the output signal (image data) from the scanner 12 is delivered to the image processing apparatus 14.

Figure 2:
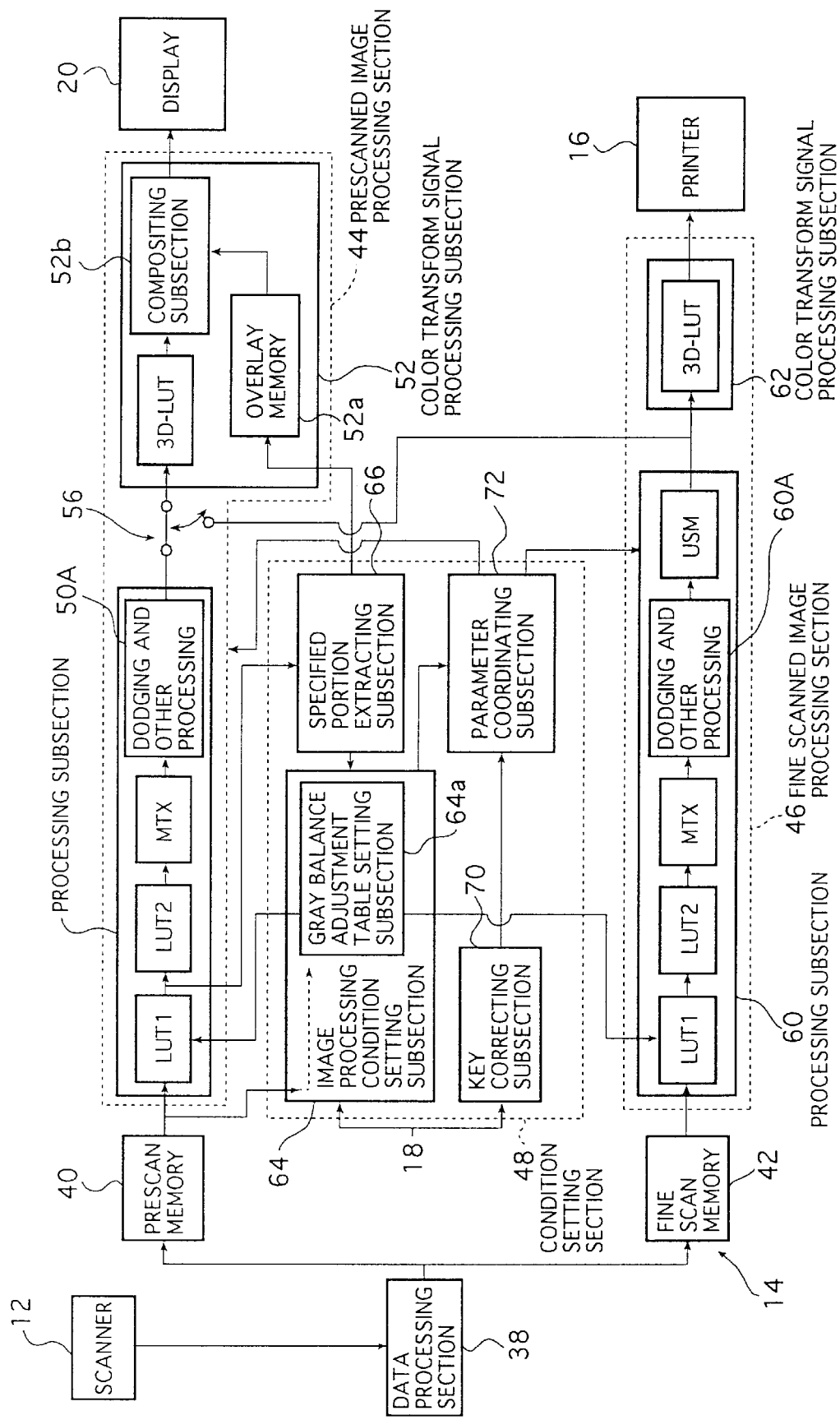
FIG. 2 is a block diagram for an example of the image processing apparatus in the digital photoprinter shown in FIG. 1.

FIG. 2 is a block diagram for the image processing apparatus 14. As shown, the image processing apparatus 14 (hereinafter referred to simply as the "processor 14") comprises a data processing section 38, a prescan (frame) memory 40, a fine scan (frame) memory 42, a prescanned image processing section 44, a fine scanned image processing section 46, and a condition setting section 48.

FIG. 2 is mainly intended to show the sites that are related to image processing. In addition to the components shown in FIG. 2, the image processor 14 includes a CPU that controls and manages the photoprinter 10 in its entirety including the image processor 14, a memory that stores the information typically necessary for the operation of the photoprinter 10, and means for determining a specific value to which the variable diaphragm 24 should be stopped down during fine scanning and the storage time of the CCD sensor 34. The manipulating unit 18 and the display 20 are connected to the associated sites via the CPU and related parts (i.e., CPU bus).

The output signals associated with R, G and B that have been delivered from the scanner 12 are processed in the data processing section 38 where they are subjected to various processes including A/D (analog/digital) conversion, log conversion, DC offset correction, darkness correction and shading correction and the resulting digital image data is stored in the prescan memory 40 if it is prescanned image data and in the fine scan memory 42 if it is fine scanned image data.

It should be noted here that the prescanned (image) data and the fine scanned (image) data are essentially the same except for the pixel density and the signal level. In the illustrated apparatus, the amount by which the variable diaphragm 24 is stopped down during fine scanning is set to an optimal value on the basis of the prescanned data by means of the processor 14 and the signal levels of the prescanned and fine scanned data are varied accordingly.

The prescanned data stored in the prescan memory 40 is processed in the prescanned image processing section 44 and the fine scanned data stored in the fine scan memory 42 is processed in the fine scanned image processing section 46.

The prescanned image processing section 44 comprises an image processing subsection 50 and a color transform signal processing subsection 52. The fine scanned image processing section 46 also comprises an image processing subsection 60 and a color transform signal processing subsection 62.

The image processing subsection 50 in the prescanned image processing section 44 (which is hereinafter referred to as "processing subsection 50") and the image processing subsection 60 in the fine scanned image processing section 46 (which is hereinafter referred to as "processing subsection 60") are both a site at which the image (image data) read with the scanner 12 is subjected to a specified kind of image processing in accordance with the image processing conditions set by means of the condition setting section 48 that will be described below in detail. Except for the pixel density of the image data to be processed, the two processing subsections perform essentially the same processing.

The image processing to be performed by the processing subsections 50 and 60 may be exemplified by at least one process selected from among gray balance adjustment (color balance adjustment), contrast correction (gradation conversion), lightness correction, dodging (compression/expansion of the dynamic range of densities), saturation correction, gray balance correction for removal of stain, color correction, blurring and the correction of an exposing illuminant. The fine scanned data processing subsection 60 also performs sharpening.

Figure 3A:
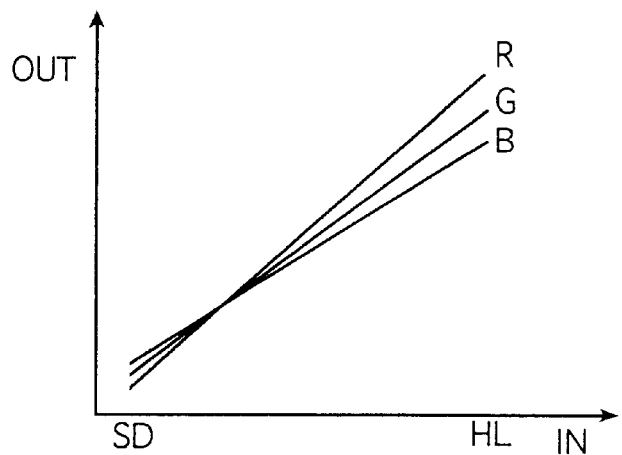
FIGS. 3a, 3b and 3c show three LUTs used to perform different kinds of image processing with the image processing apparatus shown in FIG. 2.
Figure 3B:
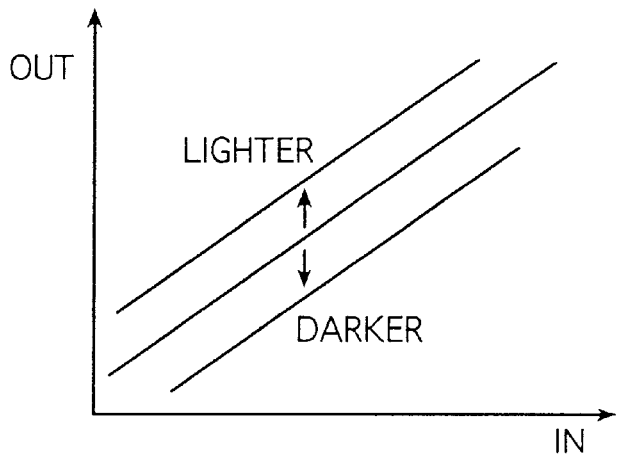
Figure 3C:
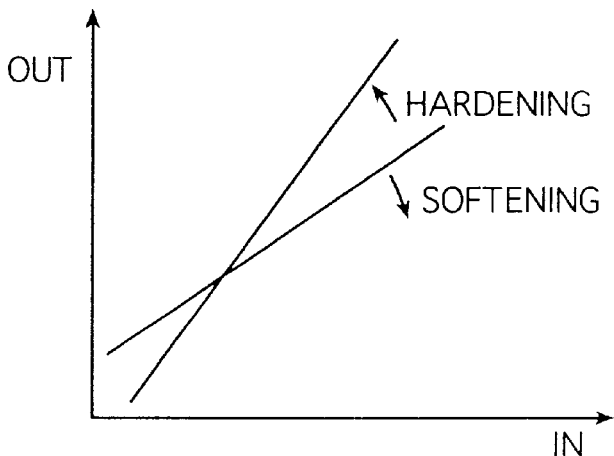
Figure 4:
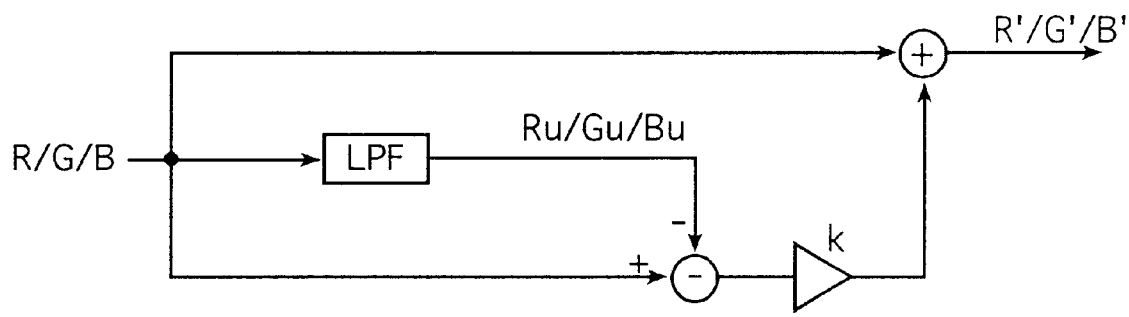
FIG. 4 shows in conceptual form a processor that performs sharpening.

These corrections may be performed by any known methods that comprise appropriate combinations of arithmetic operations for image processing, processing with LUTs (look-up tables), matrix operations and processing with filters. For instance, gray balance adjustment may be performed using a gray balance adjustment table as shown in FIG. 3a; lightness correction may be performed using a lightness correction table as shown in FIG. 3b; and contrast correction may be performed using a contrast correction table as shown in FIG. 3c. Saturation correction may be performed by matrix operations. Sharpening may be performed using an unsharpness mask (USM) as shown in FIG. 4. Briefly, the original images R, G and B are averaged with a low-pass filter (LPF) to produce averaged images $R_U$, $G_U$ and $B_U$ and the difference between each original image and the aver aged image is multiplied by a coefficient of sharpness correction k; the resulting images are respectively added to the original images (or averaged images) to produce sharpened images R', G' and B'. For dodging, a blurred image (data) is generated by filtering and then used to compress or expand the dynamic range of the original image (see, for example, the specifications of Japanese Patent Application Nos. 165965/1995, 337509/1995 and 207941/1997).

In each of the processing subsections 50 and 60 shown in FIG. 2, gray balance adjustment is performed with LUT1, lightness and contrast corrections with LUT2 and saturation correction with MTX. Sharpening is performed with USM in the processing subsection 60. Dodging and other processes are performed in blocks 50A and 60A in response to an operator's command or in accordance with image data.

The color transform signal processing subsection 52 in the prescanned image processing section 44 is a site at which the image data processed by the processing subsection 50 is transformed with 3D (three-dimensional)-LUTs or like means to produce image data corresponding to the display on the display 20; in addition, for partial image presentation on the display 20, the color transform signal processing subsection 52 performs scaling or the like by selecting or interpolating the necessary pixels and supplies the resulting image data to the display 20. The color transform signal processing subsection 52 also has an overlay memory 52a for storing the principal part of an image extracted with a specified portion extracting subsection 66 to be described later in this specification and a compositing subsection 52b that assembles the principal part with the displayed image to produce an enhanced representation.

A switching means 56 is provided upstream of the color transform signal processing subsection 52 so that it can be selectively connected to the processing subsection 50 or the processing subsection 60 of the fine scanned image processing section 46. Hence, the display 20 is adapted to be capable of presenting not only a prescanned image but also a fine scanned image if it is necessary.

The color transform signal processing subsection 62 of the fine scanned image processing section 46 is a site at which the image data processed by the processing subsection 60 is similarly transformed with 3D-LUTs to image data corresponding to image recording by the printer 16, to which it is then supplied.

The conditions for the various kinds of image processing to be performed by the prescanned image processing section 44 and the fine scanned image processing section 46 are set by the condition setting section 48, which comprises an image processing condition setting subsection 64, a specified portion extracting subsection 66, a key correcting subsection 70 and a parameter coordinating subsection 72.

In the image processing condition setting subsection 64 (which is hereinafter referred to simply as "setting subsection 64"), a certain kind of image processing that should be applied is selected from the processes already mentioned above. In addition, using the prescanned image, the setting subsection 64 sets the conditions for the image processing that should be performed in the processing subsections 50 and 60 and supplies the thus set conditions to the parameter coordinating subsection 72.

Specifically, the setting subsection 64 constructs density histograms, calculates characteristic quantities of an image such as its average density, highlight (minimum density) and shadow (maximum density) and calculates LATD (large-area transmission density); in addition, in response to an operator's command that is optionally entered from the manipulating unit 18, the setting subsection 64 performs various operations such as construction of gray balance adjustment, lightness correction and contrast correction tables (LUTs), generation of matrix operations for saturation correction and the determination of a coefficient for sharpness correction k (specifically, a corrected value of the correction coefficient that is set as a default); the setting subsection 64 may determine any other necessary image processing conditions.

It should be noted that the image processing conditions mentioned above are set (altered or adjusted) by the image processing apparatus of the invention on the basis of extraction of a specified image portion or in response to an associated operator's command. A detailed discussion of this point will be made hereinafter.

The specified portion extracting subsection 66 (which is hereinafter referred to simply as "extracting subsection 66") is a site of extracting a specified portion of the image that has been read with the scanner 12. In the illustrated case, the extracting subsection 66 extracts a specified portion of the image using the prescanned image (data) that has been subjected to gray balance adjustment with LUT1; the extracted information (i.e., the result of extraction) is sent to the setting subsection 64 and the extracted specified portion is optionally supplied to the overlay memory 52a in the color transform signal processing subsection 52.

In the present invention, the image from which a specified portion is to be extracted is in no way limited to the image that has been subjected to gray balance adjustment. If desired, a specified image portion may be extracted from the image that has been subjected to gray balance adjustment, light correction and contrast correction which are three basic color/tone corrective measures. To mention just one example, a specified portion may be extracted from image data that has been processed with LUT1 and LUT2. In practice, however, a specified image portion can be extracted with satisfactory precision from an image that has been only subjected to gray balance adjustment and a system configuration that allows for a specified portion to be extracted from an image that has solely been subjected to gray balance adjustment is preferred for several reasons such as the absence of the need to make a second setting (change) the conditions for contrast or lightness correction according to the specified portion to be extracted and the possibility of performing efficient image processing by various means such as coordination of various kinds of image processing and the deletion of overlapping portions.

In the image processing apparatus of the invention, a specified portion may be extracted not from the image that has been subjected to gray balance adjustment and other treatments but from an unprocessed image. This approach suffers from lower precision but, on the other hand, it is preferred from a throughput viewpoint since the image processing of the prescanned image for setting and displaying the image processing conditions and the extraction of a specified image portion can be performed in parallel steps. A detailed discussion of this point will be made later.

The "specified image portion" as extracted in the processor 14 of the invention may be exemplified by the center of an image, its periphery, a principal subject, objects other than the principal subject, the face of a human subject and other parts of the human subject.

These specified image portions may be set as defaults in the processor 14 or selectively set by the operator; alternatively, specified image portions may be directly designated in the picture by the operator using the keyboard 18a or mouse 18b. If desired, the processor may be adapted to be capable of selecting one of these modes.

The method of extracting a specified image portion is not limited in any particular way; if it is in the center or at the periphery of the image, it may be extracted by selecting a preset region or one that has been suitably set by the operator or the like.

If the specified image portion is the principal subject or the face of the subject, any known methods of extracting specified image portions (extraction algorithms) may be employed.

An exemplary method of extracting a specified portion of an image is described in Unexamined Published Japanese Patent Application (kokai) No. 138470/1997, according to which different methods of extraction as by extracting a specified color, extracting a specified geometrical pattern and eliminating a region estimated to represent the background, are evaluated preliminarily to determine the weights for the respective methods, the specified portion of an image is extracted by each method and weighted by the predetermined weights and the specified image portion is identified and extracted accordingly.

Another method of extracting the specified portion of an image is described in Unexamined Published Japanese Patent Application (kokai) No. 138471/1997, according to which the density or luminance of more than one point in a particular image are measured and the amount of the change between measurements is determined and the point with the amount of such change being greater than a specified value is set as a reference point; thereafter, a search scope and a pattern of search directions are set within a specified range from the reference point using a parameter such as the amount of change in density or luminance and a search is made for the point which, within the search scope and in the directions dictated by the pattern of search directions, experiences a change in density or luminance greater than a specified value; then, another search is made with reference to that point and the same procedure is repeated until a plurality of reference points are searched and set; the specified portion of the image can be extracted by connecting these reference points.

Other methods that can advantageously be used in the present invention to extract a specified image portion are described in Unexamined Published Japanese Patent Application (kokai) Nos. 346333/1992, 158164/1993, 165120/1993, 160993/1994, 184925/1996, 101579/1997, etc.

The films used with an Advanced Photo System are provided with magnetic recording tracks and the magnetic recording means in the camera can record shooting information such as the position of the principal part of the image taken, magnification and the shooting format (type C, type H or type P). If such shooting information can be identified or has been supplied from the customer, the processor 14 of the invention may utilize the information to extract a specified image portion or shorten the extraction time or enhance the precision in the step of extraction. For example, if the position of the principal part of a picture (e.g. the face of a human subject) has been recorded in the film F, it may be utilized to extract a specified portion of the picture or such information may be utilized to restrict the range from which the specified image portion is to be extracted. If the magnification has been recorded, the size of the specified image portion to be extracted can be roughly estimated if it is the face of a person and, hence, the extraction time can be shortened. If the shooting format has been recorded, the region in which the specified image portion is to be searched for can be restricted to the interior of the format and, hence, the extraction time can be shortened.

If the operator is to designate the specified image portion directly in the picture, he may designate a point in the specified portion of the image (e.g. prescanned image) on the display 20 with the aid of the mouse 18b or keyboard 18a and he may then extract the specified portion by evaluating the continuity (e.g. color continuity) of the image from the designated point. Alternatively, the specified portion may be selected from the displayed image with the aid of the mouse 18b or keyboard 18a.

In the illustrated image processor, the result of extraction of the specified image portion may, as required, be presented on the display 20. If necessary, the operator may adjust the result by such steps as alteration, addition and cancellation. A detailed discussion of this point will be made later.

Having thusly extracted a specified image portion, the image processing apparatus of the invention then sets the aforementioned image processing conditions accordingly (through adjustment, alteration or selection); in other words, the apparatus sets the image processing conditions in accordance with the scene of a picture of interest and this enables consistent production of images of even higher quality than has been attainable in the prior art.

Consider, for example, the case where a specified image portion is the face of a person. If the face is within the picture and larger than a specified value, the image processor 14 concludes that the picture is a close-up scene of the person and sets (alters) the image processing conditions such as to provide a softer tone and a less intense sharpness than in the usual case of image processing (the processing under such conditions is hereinafter referred to as "processing A"). Tone (gradation) adjustment may be performed by adjusting the table used in the aforementioned process of contrast correction. The sharpness intensity may be adjusted (lowered) by reducing the aforementioned coefficient of sharpness correction k (i.e., a corrected value of the aforementioned default).

If many faces of a medium size (within a specified size) are within the picture, the image processor 14 concludes that the image is a formal portrait or a scene of like nature and sets the usual standard image processing conditions (the processing under such conditions is hereinafter referred to as "processing B").

If many face s smaller than a specified size are with in the picture, the image processor 14 concludes that the image is a group portrait or a scene of like nature and sets the usual standard d image processing conditions (the processing under such conditions is hereinafter referred to as "processing C"). It should, however, be noted that in order to ensure sharp reproduction of the details of each small face, the original image is preferably read at the highest possible density. A specific means of satisfying this need is to use the aforementioned method of pixel shifting when the film F is read with an area CCD sensor (CCD sensor 34) as in the illustrated case and slowing down the speed of auxiliary scanning if a line CCD is used in scan reading.

If no face is within the picture, the image processor 14 concludes that the image is a landscape and sets a comparatively hard tone and a comparatively intense sharpness (the processing under such conditions is hereinafter referred to as "processing D").

The setting of image processing conditions according to a specified image portion may be performed automatically with the setting subsection 64 in accordance with the specified portion extracted with the extracting subsection 66. Alternatively, the operator may evaluate the scene of interest from the extracted specified portion and designates suitable image processing conditions (as selected from processings A–D) or alter the current conditions. Preferably, automatic or operator-entered setting is selectable as an operational mode.

Automatic processing with the setting subsection 64 is suitable for the case where high throughput is important or the operator does not have high enough skill; operatordependent processing is suitable for the case where high quality is more important or the operator has high enough skill.

In order to produce images of even better quality in the present invention, the image processing conditions are preferably altered depending upon whether the area of the image to be processed is the extracted specified portion or other regions. If processing A is found to be appropriate in view of the extracted specified portion, only the conditions for performing image processing on the face of a person which is the specified portion are adjusted to provide a softer tone and a less intense sharpness and the other regions are subjected to image processing under the standard conditions.

To perform image processing under different conditions in the face and other regions, the weighting coefficient as a magnification factor may be varied according to the region if the processing is an arithmetic operation. If the processing uses LUTs, a method as shown in FIG. 5 may be employed; a plane of weighting coefficients for the face region is provided and, at the same time, different LUTs are provided for the face region (the extracted specified portion) and the other regions; the results of processing of the respective regions are multiplied by different weights (in the illustrated case, "weight" is used for the face region and "1-weight" for the other regions) and the multiplied results are thereafter combined.

If the face and other regions are to have different tones, edges should not be visible; to this end, gradually varying weighting coefficients are preferably applied to the neighborhood of the outline of the face so that no discontinuity will occur at the outline of the face.

Figure 5:
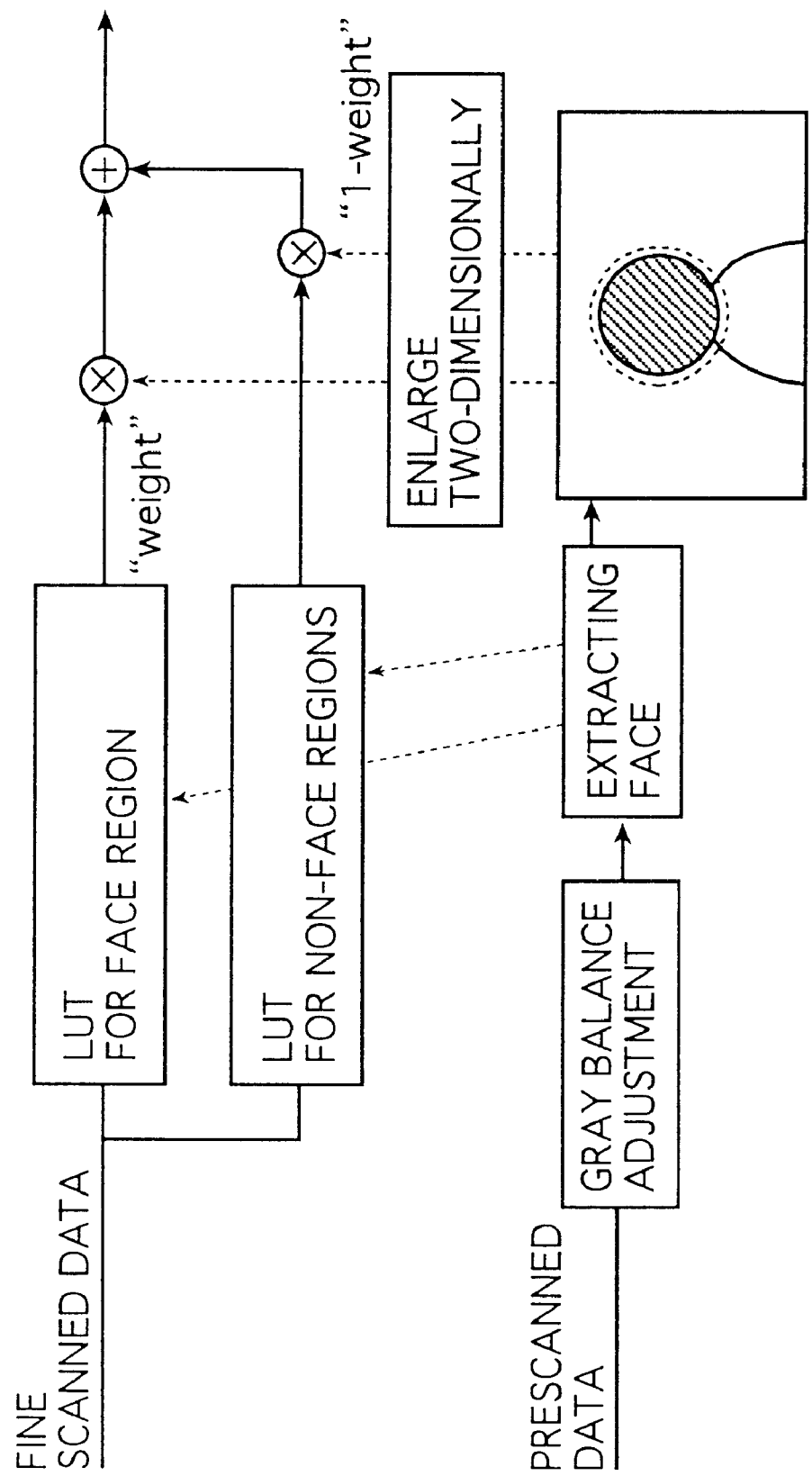
FIG. 5 shows in conceptual form an example of the image processing to be performed by the image processing apparatus shown in FIG. 2.

As shown in FIG. 5, the plane of weighting coefficients has only a resolution compatible with the prescanned data, so in order to process the fine scanned data, the plane must be enlarged two-dimensionally to ensure matching with the pixel positions of the fine scanned data.

A command for the above-described procedure of processing the specified image portion and the other regions under different conditions may be entered by the operator who selects between the need and the absence of the need to change the processing conditions; alternatively, the setting subsection 64 may execute the procedure automatically on the basis of the decision from the image data; if desired, the image processor 14 may be adapted such that the operator-dependent or automatic decision is selectable as an operational mode.

The conditions for the image processing that is to be performed on the specified portion or other regions may be designated by the operator or automatically set with the image processor.

In the present invention, the image processing image portion (particularly the principal part of the image) toward the background. This technique is effective in providing a three-dimensional feel or perspective for the image to be finally produced.

Figure 6:
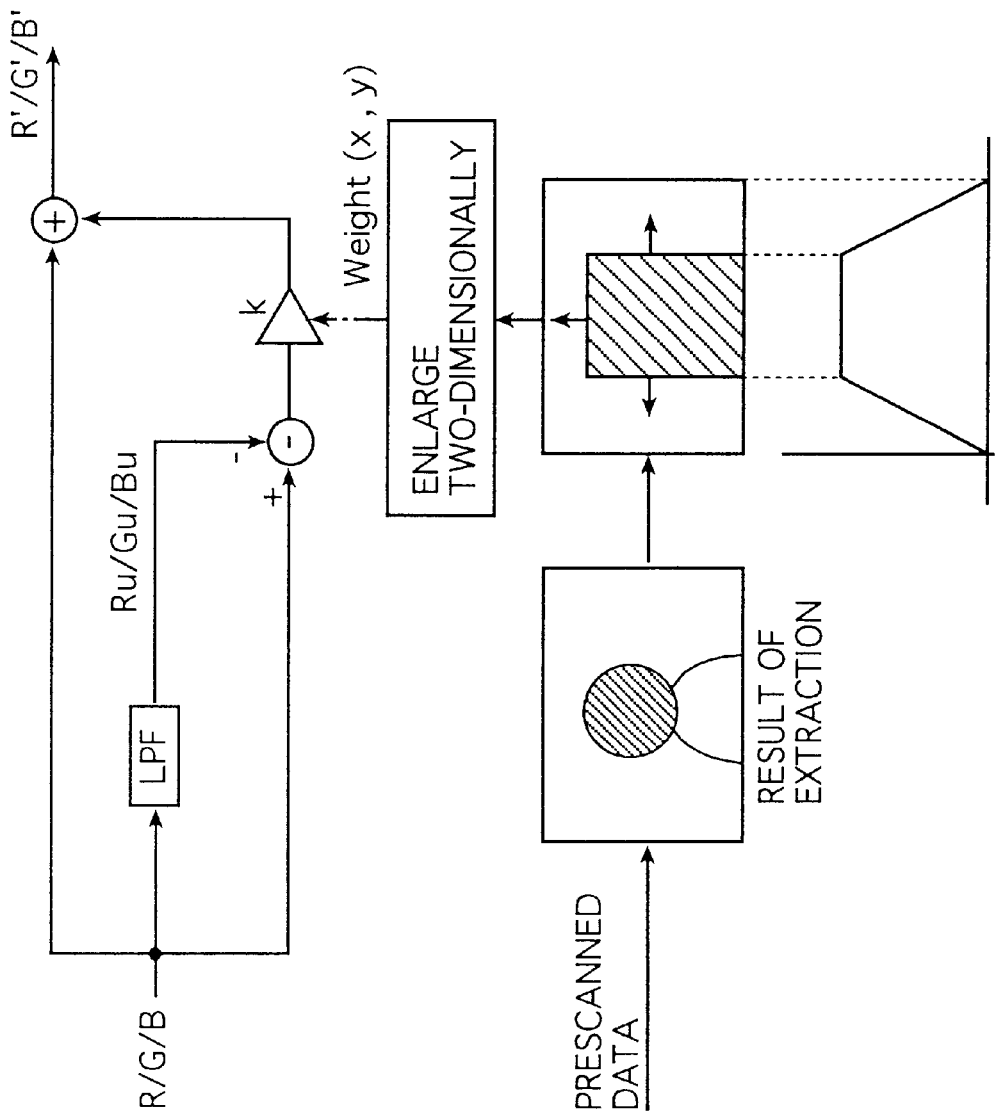
FIG. 6 shows in conceptual form another example of the image processing to be performed by the image processing apparatus shown in FIG. 2.

An example of the processing by this technique is illustrated in FIG. 6 which assumes that the specified image portion extracted from the prescanned data is the face of a person and that the picture is a close-up of the person. On the basis of the result of extraction of the specified image portion, the weighting coefficients [weight(x,y), where (x,y) represents pixel position] by which the coefficient of sharpness correction k for use in sharpening are reduced in a pixel-position dependent manner from the person toward the background (the periphery of the picture). This process may be expressed by the following equations:

$$R'=R+k\times \text{weight}(x,y)\times(R-R_U)$$

$$G'=G+k\times \text{weight}(x,y)\times(G-G_U)$$

$$B'=B+k\times \text{weight}(x,y)\times(B-B_U)$$

The region-dependent coefficient of sharpness correction may be determined as appropriate for the position and size of the specified image portion.

Key correcting subsection 70 is such that the amounts of adjustment of the image processing conditions are calculated in response to commands for color adjustment, density adjustment, contrast (tone) adjustment, sharpness adjustment and saturation adjustment that are entered by typing on lightness (D) adjustment key, C (cyan), M (magenta) and Y (yellow) color adjustment keys, γ (contrast) adjustment key, sharpness adjustment key and saturation adjustment key that are set on the keyboard 18a, as well as in response to the manipulation of the mouse 18b; the calculated values are supplied to the parameter coordinating subsection 72.

If inputs for color adjustment are entered from the manipulating unit 18, the corresponding amounts of correction are calculated in the key correcting subsection 70 and, in accordance with the calculated amounts of correction, the parameter coordinating subsection 72 corrects the tables for gray balance adjustment constructed with the setting subsection 64, whereupon the slopes of the respective adjustment tables R, G and B are changed. If an input for density adjustment is entered, the table for lightness correction is accordingly adjusted as shown in FIG. 3b as in the case of the tables for gray balance adjustment. If an input for contrast adjustment is entered, the table for contrast correction is likewise adjusted as shown in FIG. 3c. If a command for saturation adjustment is entered, the matrix operations are corrected accordingly. If a command for sharpness adjustment is entered, the coefficient for sharpness correction k is corrected accordingly.

The parameter coordinating subsection 72 receives the image processing conditions set by the setting subsection 64, sets the supplied image processing conditions both in the processing subsection 50 of the prescanned image processing section 44 and in the processing subsection 60 of the fine scanned image processing section 46, and corrects (adjusts) the thus set image processing conditions in accordance with the amounts of adjustments calculated in the key correcting subsection 70 (or make a second setting with the thus corrected image processing conditions).

Figure 7:
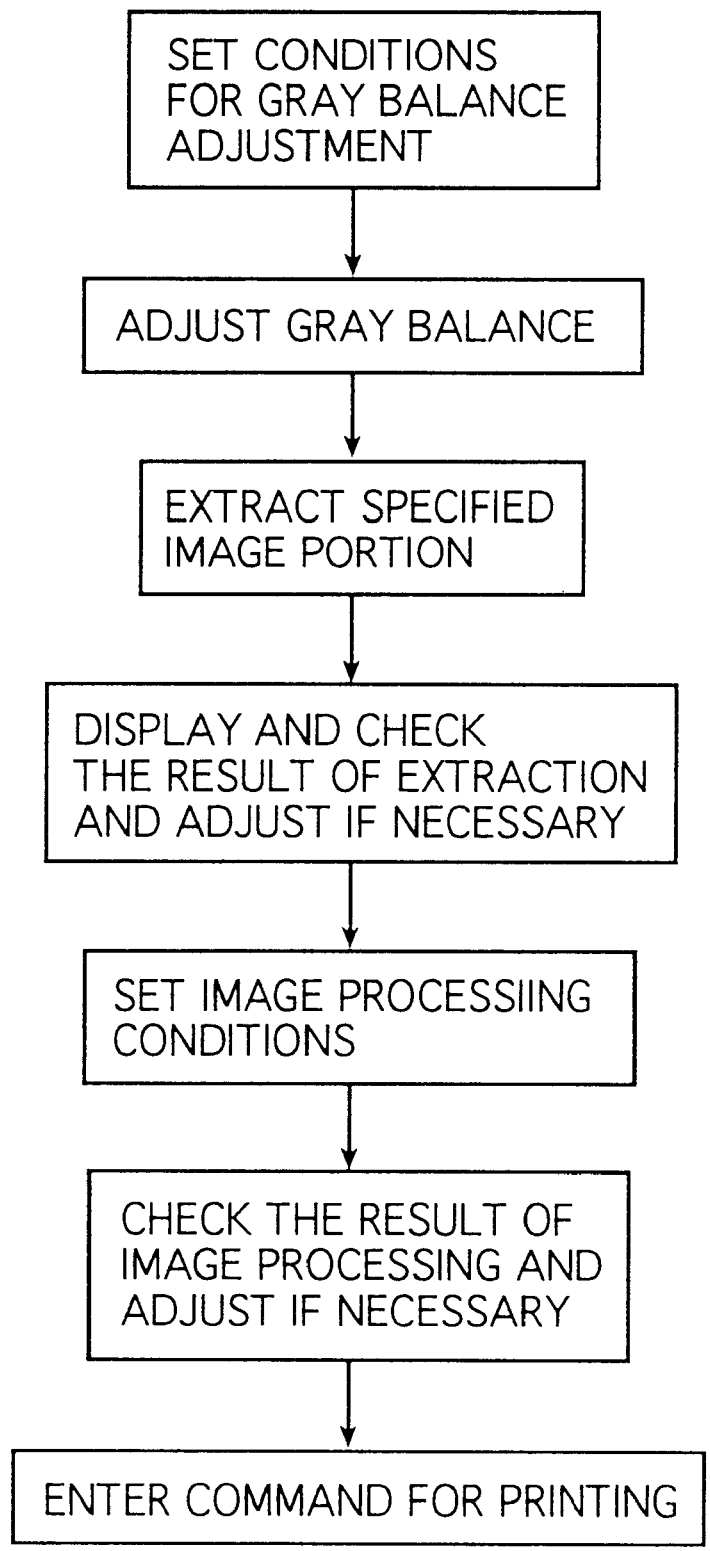
FIG. 7 is a flowchart for the sequence of image processing jobs to be performed by the image processing apparatus shown in FIG. 2.

The image processing apparatus of the invention will now be described in greater detail by explaining the action of the image processor 14 with reference to the flowchart in FIG. 7.

When prescanned data is stored in the prescan memory 40 as mentioned above, the setting subsection 64 reads the stored data from the memory. Then, the gray balance adjustment table setting subsection 64a in the setting subsection 64 constructs gray balance adjustment tables and sets them in LUT1 in each of the processing subsection 50 (hardware) of prescanned image processing section 44 and the processing subsection 60 (hardware) of fine scanned image processing section 46.

In parallel with these steps, the reading conditions for fine scanning are set exemplified by the determination of the value to which the variable diaphragm 24 should be stopped down and the scanner 12 performs fine scanning, whereupon the fine scanned data are sequentially transferred to and stored in the fine scan memory 42.

When the gray balance adjustment tables have been set in the processing subsection 50 (particularly in LUT1), prescanned data is read from the prescan memory 40 and only gray balance adjustment is performed in the processing subsection 50, with the resulting image data being subsequently supplied into the extracting subsection 66, where a specified image portion is extracted in the manner already described before.

Optionally, the gray balance adjusted image data may be supplied into the color transform signal processing subsection 52 so that the prescanned image is presented on the display 20.

When the extraction of the specified image portion ends, the result (i.e., the extracted specified portion) is sent to the overlay memory 52a in the color transform signal processing subsection 52, thence to the compositing subsection 52b where the result is assembled with the displayed image so that the result of extraction is presented on the display 20.

The method of displaying the result of extraction is not limited in any particular way. In an exemplary method, the prescanned image is presented on the display 20 as mentioned above and the area of the image that has been extracted as the specified portion is emphasized by a suitable technique such as halftoning, hatching or rendering in a specified color.

Figure 8A:
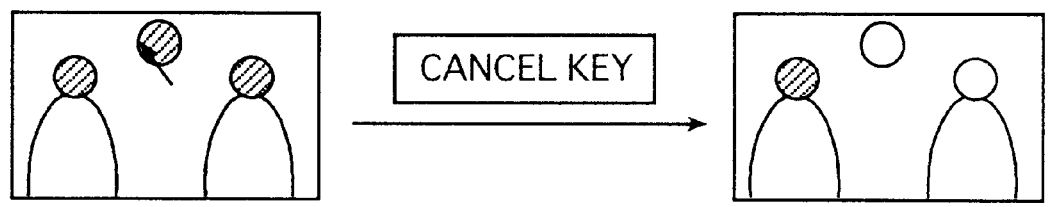
FIGS. 8a and 8b show in conceptual form two exemplary procedures of image processing in the image processing apparatus shown in FIG. 2.

The operator checks the result of extraction of the specified image portion and makes any necessary adjustment. Take, for example, the case where a region unsuitable as the specified image portion (which is assumed to be the face of a person in the present discussion) has been extracted. Then, as shown in FIG. 8a, the unwanted region is designated by pointing with the mouse 18b or some other suitable means and canceled by pressing a CANCEL key on the keyboard 18a or the like.

Figure 8B:
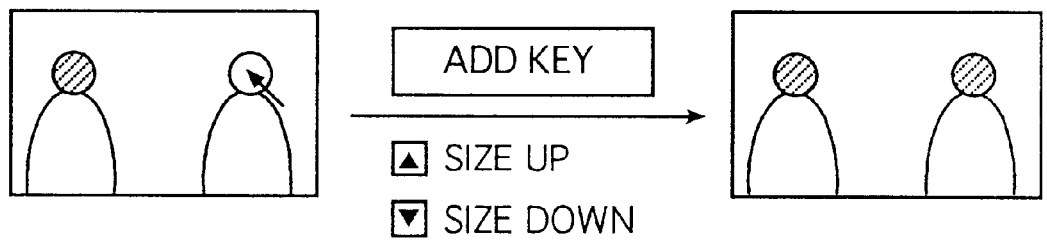

In a different case, the region that should be extracted as the specified image portion may have not actually been extracted. Then, as shown in FIG. 8b, an ADD key on the keyboard 18a or the like is pressed and the region to be added is designated by pointing with the mouse 18b or some other suitable means, whereupon the face of a person is added. If necessary, the size of the face (the region of the specified portion) to be added may be adjusted by pressing a SIZE ADJUST key which may be a SIZE UP key or a SIZE DOWN key.

If the operator finds that the specified image portion has been extracted appropriately, he enters a command for finalizing that specified portion and performing a certain kind of image processing that is suitable for the extracted specified portion. Referring to the illustrated case, the operator may conclude that the picture in the scene is a close-up of a person and issues a command for performing the already mentioned processing A (for providing a softer tone and a less intense sharpness). The command is sent to the setting subsection 64 which, in accordance with the prescanned data (preferably after gray balance adjustment) and the received command and, further optionally, in response to inputs from the manipulating unit 18, selects the kind of image processing to be executed, constructs a contrast correction table and a lightness correction table, calculates a corrected value of the coefficient of sharpness correction k to be used in sharpening, generates matrix operations for saturation correction and performs any other operations to set the desired image processing conditions, which are thereafter sent to the parameter coordinating subsection 72.

In the foregoing case, the operator checks if the extracted specified image portion is appropriate or not. However, the image processing apparatus of the invention is in no way limited to this particular case and image processing conditions may be set without the operator checking for the appropriateness of the extracted specified image portion. Preferably, the image processing apparatus of the invention is adapted to be capable of selecting between two modes, one for the operator to check the result of extraction of the specified image portion and the other for not making such a check. If no checking step is to be done, the step of presenting the extracted specified portion on the display 20 may be omitted.

As also mentioned earlier in this specification, the image processing apparatus of the invention is in no way limited to the case of the operator entering a command for a specific kind of image processing and the image processing apparatus may automatically decide upon what processing should be done. In this alternative case, the information about the extracted specified portion is sent from the extracting subsection 66 to the setting subsection 64, which on the basis of the prescanned data and the extracted specified portion, sets the desired image processing conditions in the manner already described above and sends them to the parameter coordinating subsection 72.

The parameter coordinating subsection 72 sets the received image processing conditions at specified sites (hardware) in both the processing subsection 50 of the prescanned image processing section 44 and the processing subsection 60 of the fine scanned image processing section 46. For example, a contrast correction table and a lightness correction table are combined and set in LUT2 in each of the processing subsections 50 and 60; matrix operations for saturation correction are set in MTX in each of the processing subsections; the coefficient for sharpness correction preliminarily set as a default is added with a corrective value to produce the coefficient of sharpness correction k, which is set in USM in the processing subsection 60 of the fine scanned image processing section 46.

Subsequently, the prescanned data is read from the prescan memory 40, processed under the image processing conditions that have been set in the processing subsection 50 and transformed in the color transform signal processing subsection 52 to produce a prescanned image that has been given all of the specified kinds of processing, which is then presented on the display 20.

If necessary, only the required portion such as the region including the extracted specified portion may be presented enlarged on the display 20. A preferred procedure for this case is as follows: the switching means 56 is disconnected from the processing subsection 50 and connected to the processing subsection 60 so that the fine scanned data for the required region is read from the fine scan memory 42, processed in the processing subsection 60 of the fine scanned image processing section 46; the processed data is sent to the color transform signal processing subsection 52 of the prescanned image processing section 44, where it is processed to produce image data having a high enough pixel density to be compatible with fine scanning; using the thus obtained data, the specified image portion can be selectively presented enlarged on the display 20.

The color/tone of a particular image can be verified satisfactorily by displaying the whole picture based on the prescanned data. However, the picture must have high pixel density to ensure that it can be verified effectively for its structure in terms of graininess and sharpness. But as mentioned earlier in this specification, in order to display an image of high pixel density, the fine scanned data has to be image processed in the image processing subsection 60 and subsequently sent to the color transform signal processing subsection 52 of the prescanned image processing section 44 but this only lowers the throughput of the overall image processing operation.

Under the circumstances, the operator may have an option to select between the two modes, one for displaying the whole picture and the other for displaying only a portion of the picture, and the image processor is preferably adapted to be capable of selecting a suitable mode depending on the need.

Looking at the presentation on the display 20, the operator verifies the image, or the result of the image processing, and optionally adjusts its color/density, gradation, saturation, sharpness and other characteristic features using the above-mentioned keys set on the keyboard 18a.

The inputs of these adjustments are sent to the key correcting subsection 70, which calculates the amounts of correction of the image processing conditions in accordance with the entered inputs and sends them to the parameter coordinating subsection 72. As already mentioned, in accordance with the thus sent amounts of correction, the parameter coordinating subsection 72 corrects the adjustment tables set in LUT1 and LUT2 in the processing subsections 50 and 60, respectively, corrects the matrix operations set in MTX, and corrects the coefficient of sharpness correction k.

Therefore, in accordance with these corrections, or the operator-entered inputs of adjustments, the image presented on the display 20 also varies.

If the operator concludes that the image displayed on the display 20 is appropriate (i.e., the result of the verification is satisfactory), he manipulates the keyboard 18a or mouse 18b to enter a command for starting the printing operation.

As the result, the image processing conditions are finalized and the fine scanned data is read from the fine scan memory 42, processed in the processing subsection 60 in the fine scanned image processing section 46 under the finalized conditions, sent to the color transform signal processing subsection 62, where it is converted to image data associated with the image recording by the printer 16, to which it is subsequently sent.

It should be remembered that the present invention is not limited to the case of the operator checking the result of image processing. If desired, the image processing conditions may be finalized at the point of time when the parameter coordinating subsection 72 ended the setting of those conditions in the processing subsection 60 of the fine scanned image processing section 46, whereupon the fine scanned data is processed automatically and sent to the printer 16. Preferably, modes or some other suitable selection means are provided to enable the operator to check or not check the result of image processing.

In the preceding cases, determination as to whether the result of extraction of a specified image portion is appropriate or not, selecting/issuing a command for a certain kind of image processing that is dependent on the result of extraction of the specified image portion, determination as to whether the result of image processing is appropriate or not and entry of a command for printing are all effected by the operator, who then issues a command for proceeding to the next step. The present invention is in no way limited to these cases and as already mentioned, at least one of these operative and determining steps or even all of them may be performed automatically with the image processor 14.

As the process involves an increased number of operator-dependent steps, it becomes more suitable for a job that is executed by a highly skilled operator or for the purpose of producing high-quality prints. Conversely, a process involving an increased number of device-dependent automatic steps, it becomes more suitable for a job that is executed by an unskilled operator or for the purpose of increasing the throughput.

The operations described above may be performed by the operator who selects between an automatic mode and a manual mode as needed by a specific step in the process under execution. More preferably, as mentioned earlier, various modes are preset including a MANUAL mode in which all operations are performed by the operator, an AUTO mode in which all operations are executed automatically with the apparatus, a SEMIAUTO mode A in which only the determination as to whether the result of image processing is appropriate or not and the entry of a command for printing are made by the operator, a SEMIAUTO mode B in which only the determination as to whether the result of extraction of a specified image portion is appropriate or not, the determination as to whether the result of image processing is appropriate or not and entry of a command for printing are made by the operator, and a SEMIAUTO mode C in which only the entry of a command for image processing is made by the operator or, alternatively, the user has an option to set these modes on the site, so that a suitable mode can be selected as appropriate for such factors as the desired print quality or the expertise of the operator.

Needless to say, the apparatus may be so adapted that during the process of operations in a selected mode, it can be interrupted by manipulation with the keyboard 18a or mouse 18b to enable either automatic or manual execution of a specified operation.

The processor 14 shown in FIG. 2 extracts a specified image portion using prescanned data that has been adjusted in gray balance (or subjected to color/tone correction); however, this is not the sole case of the invention and a specified image portion may be extracted using prescanned data that has not been processed at all after being read from the prescan memory 40. In this case, the prescanned image data stored in the prescan memory 40 is read into both the image processing condition setting subsection 64 and the specified portion extracting subsection 66 so that the setting of image processing conditions and the extraction of a specified image portion and, further optionally, the image processing of the prescanned image are performed in parallel steps. Also parallel to these operations, fine scanned data is transferred to and stored in the fine scan memory 42.

When the extraction of a specified image portion ends, the subsequent steps are essentially the same as in the aforementioned case; after optional steps such as the verification of the result of extraction of the specified portion, the image processing conditions are set and, after optional verification of the result of the processing, the image processing conditions and so forth are finalized and the fine scanned data is processed.

According to this image processing method, a specified image portion is extracted without any treatments including gray balance adjustment, so the precision of overall image processing is rather low; on the other hand, this method is preferred from a throughput viewpoint since the setting of image processing conditions and the extraction of a specified image portion and, further optionally, the image processing of the prescanned image can be performed in parallel steps.

In the cases described above, prescanned data is used to extract a specified image portion, set the image processing conditions and perform other steps. The present invention is in no way limited to these cases and the steps exemplified above may be performed using fine scanned data. It should, however, be noted that steps such as the extraction of a specified image portion and the setting of the image processing conditions need not be performed with image data of high pixel density. In addition, the calculation time increases with the number of pixels. Therefore, in consideration of various factors, especially the operating efficiency, the steps mentioned above are preferably performed using prescanned data.

It should also be noted that in the foregoing cases, prescanning is performed and the prescanned data is used to set the image processing conditions and perform other steps. However, the present invention is not limited to these cases and the scanner 12 may be designed to perform only fine scanning such that the fine scanned data is partly eliminated to prepare image data of a lower pixel density like the prescanned data, which is employed in extracting a specified image portion, setting the image processing conditions and performing other steps.

The extraction of a specified image portion and the performance of the kinds of image processing that are suitable for the extracted specified image portion need not be performed in all instances of image processing with the image processing apparatus of the invention. In another preferred embodiment, the apparatus may be adapted to operate in two modes, one being a high-quality mode in which the above-described steps of extracting a specified image portion and performing the suitable kinds of image processing are taken and the other being a normal processing mode in which only standard image processing is performed without the extraction of a specified image portion or any other special steps, and the operator selects a suitable mode in accordance with his need and produces prints.

As already mentioned, the image data processed in the image processor 14 of the invention is subsequently sent to the printer 16, which is shown diagrammatically in FIG. 9. As shown, the printer 16 basically comprises a driver 80, an exposing section 82 and a developing section 84. Optical beams L are modulated, typically pulse-width modulated, in accordance with the image data sent from the image processor 14 and a light-sensitive material A is exposed with the modulated optical beams L.

The image data from the image processor 14 (particularly from the color transform signal processing subsection 62) is sent to the driver 80. In the driver 80, the image data sent from the image processor 14 (particularly from the color transform signal processing subsection 62) is converted to signals that drive AOMs 86 such that they perform pulse-width modulation of the optical beams L in accordance with the image to be recorded (the amount of exposure).

In the exposing section 82, the light-sensitive material A is exposed by scanning with the modulated optical beams L such that the image associated with the aforementioned image data is recorded on the light-sensitive material A. As shown in conceptual form in FIG. 9, the exposing section 82 comprises a illuminant 88R that issues an optical beam in a narrow wavelength range capable of exposing the R-sensitive layer in the light-sensitive material A, a illuminant 88G similarly capable of exposing the G-sensitive layer, a illuminant 88B similarly capable of exposing the B-sensitive layer, AOMs 86R, 86G and 86B that modulate the optical beams from the respective illuminants in accordance with the image to be recorded, a polygonal mirror 90 as an optical deflector, an fθ lens 92, and a means of transporting the light-sensitive material A in an auxiliary scanning direction.

The optical beams from the illuminants 88R, 88G and 88B travel at different angles to be launched into the corresponding AOMs 86R, 86G and 86B. These AOMs 86 have been supplied from the driver 80 with drive signals R, G and B in accordance with the image to be recorded, or the image data supplied from the image processor 14 and being driven with these signals, the AOMs 86 modulate the incident optical beams in accordance with the image to be recorded.

The optical beams modulated with the AOMs 86 are incident at substantially the same point on the polygonal mirror 90, from which they are reflected for deflection in the main scanning direction (indicated by arrow x in FIG. 9) and adjusted by the fθ lens 92 such that they are imaged to give a specified beam shape in a specified scan position z to be incident on the light-sensitive material A. The exposing section 82 may be furnished with an optical beam shaping means and tilt correcting optics as required.

A web of the light-sensitive material A is rolled on itself and contained in magazines which are loaded in specified positions.

The light-sensitive material A is unreeled with withdrawing rollers and cut with a cutter to a specified length corresponding to one print. By means of a pair of transport rollers 94a and 94b that are provided on opposite sides of the scan position z to constitute the means of transport in the auxiliary scanning direction (as indicated by arrow y in FIG. 9) which is perpendicular to the main scanning direction, the light-sensitive material A is transported in the auxiliary scanning direction as the scan position z is held constant relative to it.

Since the optical beams are deflected in the main scanning direction, the entire surface of the light-sensitive material A being transported in the auxiliary scanning direction is exposed by two-dimensional scanning with those beams, whereby the (latent) image associated with the image data transferred from the image processor 14 is recorded on the light-sensitive material A.

After the end of exposure, the light-sensitive material A is fed by means of a transport roller pair 96 into the developing section 84, where it is developed and otherwise processed to produce a print P.

If the light-sensitive material A is a silver salt light-sensitive material, the developing section 84 essentially comprises a color developing tank 98, a bleach-fixing tank 100, rinsing tanks 102a, 102b, 102c and 102d, a drying zone and a cutter (the latter two are not shown). After being developed and given the necessary treatments in the respective tanks, the light-sensitive material A is dried and outputted as a finished print P.

While the image processing apparatus of the present invention has been described above in detail, it should be noted that the invention is by no means limited to the embodiments described above and that various improvements and modifications can be made without departing from the scope and spirit of the invention.

As described in detail on the foregoing pages, the image processing apparatus of the invention allows for the setting of image processing conditions that are optimal for the scene of a picture of interest. If the concept of the invention is applied to digital photoprinters of the type described in the introductory part of the specification, high-quality prints reproducing images of high quality can be produced consistently.

What is claimed is:

1. An image processing apparatus comprising:
   means for receiving input image data from a source of image data supply;
   image processing means for performing necessary image processing on the input image data received by said receiving means to produce output image data;
   extracting means for extracting at least one specified portion of an image carried by the input image data; and
   setting means for setting image processing conditions in accordance with said at least one specified portion extracted by said extracting means and the input image data;
   wherein said image processing means performs the image processing on the input image data in accordance with the image processing conditions set by said setting means.

2. The image processing apparatus according to claim 1, wherein said setting means changes in accordance with said at least one specified portion extracted by said extracting means the image processing conditions set in accordance with the input image data.

3. The image processing apparatus according to claim 2, wherein said image processing conditions changed by setting means are processing contents of said image processing performed on said input image data by said image processing means.

4. The image processing apparatus according to claim 3, wherein said processing contents of said image processing are at least one process selected from the group consisting of sharpness enhancement, dodging, gradation conversion, gray balance correction for removal of stain, color correction, blurring and correction of an exposing illuminant.

5. The image processing apparatus according to claim 2, wherein said apparatus has at least one of two selecting functions, one selecting function selecting either one of a mode in which said setting means sets different image processing conditions for said at least one specified portion and other regions or a mode in which said setting means sets same image processing conditions for said at least one specified portion and other regions, and other selecting function selecting either one of a mode in which said image processing conditions for said at least one specified portion are changed or a mode in which said image processing conditions for the overall image carried by said input image data including said at least one specified portion; and
   wherein said apparatus has two swichable mode one being an automatic mode in which said at least one of the two selecting functions perform automatic selecting and the other being a command mode which relies upon operator's commands.

6. The image processing apparatus according to claim 1, wherein said setting means selects the image processing conditions in accordance with at least one specified portion extracted by said extracting means among a plurality of sets of the image processing conditions previously set.

7. The image processing apparatus according to claim 1, wherein said setting means changes the image processing conditions of the overall image carried by the input image data which contains said at least one specified portion extracted by extracting means to set same image processing conditions for said at least one specified portion and other regions.

8. The image processing apparatus according to claim 1, wherein said setting means changes the image processing conditions set in accordance with said input image data only for said at least one specified portion extracted by extracting means.

9. The image processing apparatus according to claim 1, wherein said setting means sets the image processing conditions which are different between said at least one specified portion and at least one other region.

10. The image processing apparatus according to claim 1, wherein setting of the image processing conditions in accordance with said input image data by said setting means and extraction of the at least one specified portion by said extracting means are performed in parallel steps.

11. The image processing apparatus according to claim 1, which further includes display means for presenting at least one of a result of extraction of said at least one specified portion and an image that has been subjected to the image processing in accordance with the image processing conditions set by said setting means except or including the at least one specified portion.

12. The image processing apparatus according to claim 11, wherein at least one modification of addition, correction and deletion of said at least one specified portion presented by said display means is capable of being performed.

13. The image processing apparatus according to claim 11, wherein said image performed in accordance with the image processing conditions set by said setting means and presented by said display means is capable of being modified except or including said at least one specified portion.

14. The image processing apparatus according to claim 1, wherein at least one of the steps of extracting the at least one specified portion by said extracting means, setting the image processing conditions by said setting means and presenting the image by said display means is performed using image data having a lower pixel density than the output image data.

15. The image processing apparatus according to claim 14, wherein at least one of the steps of extracting the at least one specified portion by said extracting means, setting the image processing conditions by said setting means and presenting the image by said display means that is performed using the image data having the lower pixel density than the output image data, and the step of obtaining image data having a higher pixel density than said image data having the lower pixel density as said input image data on which said image processing is performed by said image processing means to produce said output image data are performed in parallel steps.

16. The image processing apparatus according to claim 1, further comprising means for subjecting said input image data to color/tone correction, wherein said extracting means extracts the at least one specified portion using image data that has been subjected to the color/tone correction.

17. The image processing apparatus according to claim 1, further comprising means for subjecting said input image data to gray balance adjustment, wherein said extracting means extracts said at least one specified portion using image data that has been subjected to gray balance adjustment.

18. The image processing apparatus according to claim 1, wherein said setting means has an autosetup function for automatically setting up said input image data, and said extracting means extracts at leas one specified portion based on image data set up automatically by said setting means or an image carried by the image data.

19. The image processing apparatus according to claim 1, wherein said setting means has two selectable modes as setting modes of the image processing conditions, one being an automatic mode in which the setting means performs automatic setting and the other being a command mode which fully or partly relies upon operator's commands.

20. The image processing apparatus according to claim 1, wherein said setting means has two swichable modes, one setting the image processing conditions in accordance with said at least one specified portion extracted by said extracting means and said input image data, and the other setting the image processing conditions in accordance with only said input image data independent of said at least one specified portion extracted by said extracting means.

21. The image processing apparatus according to claim 1, wherein said extracting means extracts a portion of said input image data including a subject to be captured.

22. The image processing apparatus according to claim 21, wherein said setting means sets said portion of the input image data including the subject to be captured such that said image processor processes said portion of the input image data so as to provide at least one of a relatively softer tone and a relatively less intense sharpness as compared to normal image processing.

23. The image processing apparatus according to claim 21, wherein said subject to be captured is a face of a person.

24. The image processing apparatus according to claim 1, wherein said extracting means extracts a portion of said input image data not including a subject to be captured.

25. The image processing apparatus according to claim 24, wherein said setting means sets said portion of the input image data not including subject to be captured such that said image processor processes said portion of the input image data so as to provide at least one of a relatively harder tone and a relatively more intense sharpness as compared to normal image processing.

26. The image processing apparatus according to claim 24, wherein said subject to be captured is a face of a person.

27. An image processing method comprising the steps of:
   receiving image data from an image receiving means;
   extracting at least one portion of the image data;
   setting image processing conditions for each of said at least one extracted portion of the image data; and
   processing each of said at least one extracted portion of the image data;
   wherein said processing is performed on the image data in accordance with the image processing conditions set by said setting means.

28. The image processing method according to claim 27, wherein said setting method sets the image processing conditions which are different between said at least one extracted portion and at least one other region.

29. The image processing method according to claim 27, wherein said extracting includes extracting a portion of said received image data including subject to be captured.

30. The image processing method according to claim 29, wherein said setting includes setting processing conditions of said portion of the image data including the subject to be captured such that said portion of the image data is processed so as to provide at least one of a relatively softer tone and a relatively less intense sharpness as compared to normal image processing.

31. The image processing apparatus according to claim 29, wherein said subject to be captured is a face of a person.

32. The image processing method according to claim 27, wherein said extracting includes extracting a portion of said received image data not including a subject to be captured.

33. The image processing method according to claim 32, wherein said setting includes setting processing conditions of said portion of the image data not including the subject to be captured such that said portion of the image data is processed so as to provide at least one of a relatively harder tone and a relatively more intense sharpness as compared to normal image processing.

34. The image processing apparatus according to claim 32, wherein said subject to be captured is a face of a person.

* * * * *

UNITED STATES PATENT AND TRADEMARK OFFICE
CERTIFICATE OF CORRECTION

PATENT NO. : 6,473,198 B1
DATED : October 29, 2002
INVENTOR(S) : Toru Matama

It is certified that error appears in the above-identified patent and that said Letters Patent is hereby corrected as shown below:

Column 21,
Line 40, change "leas" to -- least --.

Column 22,
Line 24, after "one portion" insert -- from within the recorded image region --

Signed and Sealed this

Twenty-second Day of July, 2003

JAMES E. ROGAN
*Director of the United States Patent and Trademark Office*